United States Patent [19]

Nicastro, Jr. et al.

[11] 3,775,077

[45] Nov. 27, 1973

[54] MANUFACTURE OF VITREOUS SILICA BODIES

[75] Inventors: Carmine A. Nicastro, Jr., Big Flats; Roelant S. L. Vander Noordaa, Corning; William A. Ward, Painted Post, all of N.Y.

[73] Assignee: Corning Glass Works, Corning, N.Y.

[22] Filed: June 28, 1971

[21] Appl. No.: 157,710

[52] U.S. Cl............................. 65/18, 65/32, 65/134, 65/DIG. 8
[51] Int. Cl................................. C03b 23/20, C03b
[58] Field of Search.................. 65/32, 134, DIG. 8, 65/18

[56] References Cited
UNITED STATES PATENTS

| 2,612,726 | 10/1952 | Nordberg | 65/32 |
| 2,612,727 | 10/1952 | Nordberg | 65/32 |
| 3,113,008 | 12/1963 | Elmer | 65/32 X |
| 3,149,946 | 9/1964 | Elmer | 65/32 |
| 3,320,045 | 5/1967 | Weiss et al | 65/32 X |
| 3,620,702 | 11/1971 | DeKalb | 65/134 X |
| 2,038,627 | 4/1936 | Badger | 65/DIG. 8 |
| 3,261,676 | 7/1966 | Morelock | 65/32 X |
| 2,511,216 | 6/1950 | Miller | 65/18 UX |

Primary Examiner—Frank W. Miga
Attorney—Clarence R. Patty, Jr. et al.

[57] ABSTRACT

A green body formed of substantially −60 mesh particles of crystalline silica and/or glass having a $SiO_2$ content of at least 90 wt. percent is initially fired in ambient atmosphere of helium to temperature of about 1,600°–1,725° C. so as to leave about 5–20 percent helium-filled porosity with pore diameters of about 0.05–0.5 micron and communicating with the ambient atmosphere at the surface of the body. Then, the helium is substantially replaced with argon and firing is continued to temperature of about 1,730°–2,200° C. at a rate to concurrently effect escape of the helium from the pores substantially via the communication thereof with the ambient argon atmosphere and the virtual collapse and elimination of the pores. Resultant product is virtually free of occluded bubbles.

10 Claims, No Drawings

MANUFACTURE OF VITREOUS SILICA BODIES

CROSS-REFERENCE TO RELATED APPLICATION

Our copending U.S. Pat. application Ser. No. 157,301, filed on the same data as was this application and entitled PROCESS IMPROVEMENT FOR MANUFACTURING CLOSE TOLERANCE VITREOUS SILICA ARTICLES discloses a unique mandrel support and gravity-stretch technique that can be used in conjunction with the invention claimed in this application for the manufacture of vitreous silica crucibles and like bodies with consistently reproducible shape and size while also being virtually free of occluded bubbles.

BACKGROUND OF THE INVENTION

It has long been recognized that a serious disadvantage of vitreous silica bodies produced by firing green bodies formed of suitable particulate materials is the presence therein of occluded bubbles, whose origin is the pores of the green bodies. Among the techniques employed heretofore to minimize such occluded bubbles is the firing of the green bodies to fusion temperature thereof (i.e., above the melting point of cristobalite which is variously reported between about 1,723° C. and 1,728° C.) in an ambient atmosphere of helium (e.g. see U.S. Pat. No. 2,038,627 and German Pat. No. 621,936). However, use of that technique has not proved it capable of rendering the vitreous product virtually free of occluded bubbles as has long been desired. The noted German patent acknowledges that a significant number of such bubbles remain and suggests they be removed by the further step of hot plastic working of the vitreous silica mass. On the other hand, the noted United States patent suggests that, after the green body has been fired to a fused or viscous molten condition, the helium atmosphere be replaced with hydrogen or similar gas that is nonreactive with molten silica and the furnace components, whereby diffusion of helium through the viscous silica mass from trapped bubbles therein is somewhat accelerated. Nevertheless, vitreous silica products made by the latter procedure still contain undesirable numbers of occluded bubbles, which are in noticeable concentrations in the central portions of relatively thick bodies and are randomly scattered within relatively thin bodies. From our experience with the latter procedure, total firing periods of 1 hour (and even somewhat more than 1 hour) are not sufficient to enable virtual disappearance of the bubbles by helium diffusion through the viscous silica mass. It appears questionable that substantially longer firing periods would make any significant further reduction in the amount of bubbles without becoming an uneconomically prohibitive process for commercial purposes.

In these old processes, it is apparent that diffusion of helium through the viscous silica mass is not adequate to permit virtual elimination of the occluded bubbles, despite the fact that helium is characterized by one of the greatest rates of diffusion through not viscous silica as are known. While hydrogen appears to have a slightly better diffusion rate through hot viscous silica, we have observed that it causes detrimental effects, e.g. volatilization of a reduced silicon oxide species and increasing the water (or beta OH) content of the vitreous silica product whereby its annealing point is lowered and devitrification is enhanced, both of which effects are undesirable for crucibles and other products that are to be transparent and withstand the highest possible temperatures without deformation. Accordingly, for our purposes, substituting hydrogen for helium is not satisfactory.

SUMMARY OF THE INVENTION

We have now discovered that, by making certain unique and critical alterations in the old helium atmosphere firing process, the resultant transparent, vitreous silica bodies will be virtually free of occluded bubbles. From our research, we observed that the green body of particulate silica material could be fired in helium to an intermediate temperature below the melting point of cristobalite where some sintering of the body has occurred, but it still retained about 5-20 percent helium-filled porosity with pore diameters of about 0.05 to 0.5 micron (as determined by conventional pressurized mercury penetration porosimetry) and that communicates with the helium atmosphere at the surface of the body. We further observed, surprisingly, that such partially sintered body could be further fired in argon atmosphere without the argon replacing the helium in the pores, but permitting the helium to substantially escape through the physical communication paths of the interconnected (open) porosity to the ambient argon atmosphere as further sintering proceeded. The latter is evidenced by the resulting bodies being virtually free of occluded bubbles. Since it is known that argon has a lesser diffusion rate through hot viscous silica, it is apparent that it did not enter the pores because it would have been trapped there like the helium, only to a greater extent, to cause occluded bubbles in the final product. Thus, our uniquely improved method involves a substantial change in ambient atmosphere from helium to argon at a critical stage significantly before attaining complete fusion of the silica mass (which is contrary to the noted prior art).

Our new method of making a transparent, vitreous silica body that is at least virtually free of occluded bubbles includes the basic steps of: (a) forming a green body of substantially −60 mesh (advantageously −325 mesh) particles of material selected from crystalline silica and glass having a $SiO_2$ content of at least about 90 wt. percent, and (b) firing the green body up to and at temperature in the range of about 1,730° C. to 2,200° C. to effect fusion and coalescence of the particles. However, the latter step is now critically divided into two phases which involve: (a) conducting a first phase of the firing of the green body in an ambient atmosphere of helium up to first temperature in the range of about 1,600° C. to 1,725° C. at a rate sufficient to effect sintering of the body to a state in which the body has helium-filled pores that, as predetermined by pressurized mercury penetration porosimetry:

i. communicate at the surface of the body with the ambient atmosphere
ii. occupy about 5 to 20 percent of the volume of the body and
iii. have pore diameters in the range of about 0.05–0.5 micron, (b) then substantially changing the ambient atmosphere to one of argon, and (c) continuing the firing as a second phase thereof in the atmosphere of argon from the first temperature up to second temperature in a range of about 1,730° C. to 2,200° C. (preferably about 1,800° C. to 1,900° C.) at a rate sufficient to concurrently effect:

i. the escape of the helium from the pores substantially through the communication thereof with the argon atmosphere and ii. the virtual collapse and elimination of those pores.

As is known, it is desirable to fire the green body relatively rapidly to avoid or minimize formation of cristobalite, which would require uneconomically extra firing at the higher temperatures to eliminate such crystalline phase for transparency. However, the rate of firing in our first phase must be tempered to avoid temperature gradients through the body that lead to fusion of the surface portions of the body which would close the communication between the interconnected porosity in the body and the ambient atmosphere. An ordinary skilled worker in this art can determine the rate appropriate for any desired size and shape of body to be produced by modest and reasonable trials of varied rates in first phase firings followed by subjecting the products of such first phase firings to conventional pressurized mercury penetration porosimetry (e.g. see ASTM Bulletin No. 235, February 1959, pp. 39–44).

The rate of firing in our second phase must also be tempered to again avoid too quickly fusing the surface portions which would close off the interconnected pores from the argon atmosphere before the helium in those pores can substantially pass out therefrom via the physical communication path of the pores with the argon temperature. Similar modest and reasonable trials of second phase firing rates by a skilled worker will indicate an appropriate rate for any desired body size and shape, viz. a rate no faster than that by which the resultant product is virtually free of occluded bubbles.

In the case of green bodies having thickness not greater than about one-fourth inch, we have found a very suitable procedure to be as follows:

a. insert the green body into a hot zone having a helium atmosphere at a firing temperature in the range of about 1,730° C. to 2,200° C., b. while maintaining the body in that hot zone and upon the body attaining intermediate temperature in the range of about 1,600° C. to 1,725° C., substantially change the atmosphere to one of argon, and c. thereafter continue to maintain the body in that hot zone having the argon atmosphere until the body has attained the firing temperature.

For green bodies of thickness greater than about one-fourth inch, we have found the following procedure very satisfactory:

a. as a first phase of the firing, insert the green body into a hot zone having a helium atmosphere at first temperature in the range of about 1,600° C. to 1,725° C., b. maintain the body in that hot zone until the body has substantially uniformly attained the first temperature, c. then substantially change the atmosphere to one of argon, and d. as a second phase of the firing, increase the temperature of the hot zone, while maintaining the body therein, to second temperature in a range of about 1,730° C. to 2,200° C. at a rate sufficient to concurrently effect (i) the escape of helium from the pores as noted previously and (ii) the virtual collapse and elimination of those pores.

In the immediately preceding procedures, and for a given furnace and body, the time at which the atmosphere change is to be made can be predetermined by a trial firing of a body with suitable thermocouple arrangement for detecting when the body is at the intermediate or first temperature.

Suitable raw materials are any of the commonly available and heretofore employed substantially pure crystalline silica materials and/or high silica glasses (including fused quartz). While substantially −60 mesh particles are a suitably practical maximum size for reasonable firing periods to accomplish the desired properties, substantially −325 mesh particles (e.g. at least 95 wt. percent of all particles being −325 mesh) are advantageous for attaining the most rapid suitable firing schedules.

The green bodies may be formed by any suitable or known ceramic forming process as desired. Examples of such processes that we deem particularly useful are slip casting, isostatic pressing and extrusion, of which slip casting is our most preferred process for forming green crucibles.

According to conventional practice, the green body may be first calcined at temperature of about 750°–1,000° C. to burn out organic impurities picked up from processing and handling of the raw materials. As desired, the previously noted firing procedure can be started either with the hot calcined green body or with the calcined green body after it has been cooled to room temperature or some other temperature lower than calcining temperature.

DESCRIPTION OF PREFERRED EMBODIMENTS

In manufacturing crucibles and other articles of vitreous silica according to the new invention described herein, we usually employ the following known procedure for producing the green articles:

1. Washing fused quartz cullet in HF-NHO$_3$ acid solution,
2. Rinsing and drying of the washed cullet,
3. Dry-crushing washed cullet to about −14 mesh,
4. Wet-ball-milling (with distilled water) of −14 mesh crushed cullet to yield fused quartz slip with particles of appropriate size (e.g. 95 wt. percent of all particles being −325 mesh),
5. Casting slip into common plaster mold and allowing it to set up therein (and draining out excess slip in case of crucibles and the like),
6. Stripping mold from green casting and drying the green casting (e.g. accelerated oven drying at 250°–300° C.), and
7. Calcining green casting at about 800°–1,000° C. for about 2 hours. The fused quartz cullet employed has the following average impurities in parts per million by weight:

| | | |
|---|---|---|
| Fe$_2$O$_3$ — 5 | CaO — 12 | Li$_2$O — <1 |
| TiO$_2$ — 2 | MgO — 2 | B — 0.5 |
| Al$_2$O$_3$ — 50 | K$_2$O — 4 | ZrO$_2$ — <1 |
| | Na$_2$O — 4 | |

EXAMPLE 1

Transparent, vitreous silica crucibles virtually free of occluded bubbles were produced by employing the preceding green body forming procedure and the mandrel support and gravity-stretching technique as described in our aforementioned copending application, to which reference can be made for the details thereof. The green and fired size characteristics of these crucibles are as follows:

|  | Green | Fired |

| | | |
|---|---|---|
| Outside diameter (in.): | 6.555 | 5.940/6.000 |
| Inside diameter (in.): | 6.295/6.375 | 5.750 |
| Wall thickness (in.): | 0.090/0.130 | 0.080/0.100 |
| Length (in.): | 6 | 5.7-7.0 |
| Weight (gm.): | 435±25 | 435±25 |

The calcined green crucibles are ordinarily cooled to room temperature prior to starting the firing procedure. A suitable furnace chamber or hot zone is preheated to about 1,850° to 1,950° C. (e.g. approximately 1,900° C.) and continuously flushed with helium. One of the calcined green crucibles is inserted into that preheated hot zone. As determined by a trial firing procedure, the crucible will attain temperature in the range of 1,600°–1,725° C. approximately 100–110 seconds after being inserted into the hot zone. Accordingly, the usual procedure involves simultaneously turning off the helium supply and turning on the argon supply when the crucible has been in the hot zone for 105 seconds, at which point the incoming argon will begin flushing out the helium in the hot zone and substantially replace it therein. The crucible is further maintained in that hot zone for another 105 seconds, after which it is moved to a muffle chamber to cool. The resultant crucible is virtually free of occluded bubbles (i.e., those visible to the human eye).

When another crucible is made in the same way as the above-noted crucible, except that helium is continued in the hot zone until after the crucible has attained temperature of 1,730° C. or higher (either followed or not followed by a change over to argon in the hot zone), that other crucible (after cooling) will commonly contain a substantial number of readily visible occluded bubbles randomly scattered within it.

EXAMPLE 2

Transparent, vitreous silica solid cylinders virtually free of occluded bubbles were also produced by employing the same green body forming procedure as in the previous example. The slip-cast green cylinders had a diameter of 1.1 inches and a height of 1.1 inches.

A furnace hot zone was preheated to about 1,750°–1,760° C. and continuously flushed with helium. Some of the green cylinders were inserted into the hot zone with a graphite radiation shield between them and the graphite susceptor for more even heating of the cylinders. Upon their insertion, the hot zone temperature dropped into the range of 1,600°–1,725° C. After 20 minutes, the cylinders had attained temperature in the latter range throughout their cross-section and the atmosphere gas was changed to continuously flushing argon instead of the helium. Then the hot zone temperature was gradually increased to 1,800° C. over a period of about one hour (at the end of which the cylinders had attained 1,800° C.), and finally increased to 1,920° C. within another 5 minutes to assure elimination of any possible presence of cristobalite. After cooling, the resultant vitreous silica cylinders were thoroughly transparent and free of occluded bubbles.

Another two of the green cylinders were fired during the first or helium phase thereof in the same manner as were the above-noted cylinders. However, upon the change-over to argon in the hot zone, the furnace temperature was rapidly increased to 1,920° C. within about 4 minutes and held there for times of about 40 minutes for one of the cylinders and of about 155 minutes for the other cylinder. After cooling of each, these cylinders exhibited a massive group of occluded bubbles within their central portions. Thus, the rate of increase to 1,920° C. was too rapid and caused fusion of the surface portions of the cylinders whereby helium was trapped in the closed porosity and not even significantly reduced after 155 minutes at high temperature in argon.

Another one of the green cylinders was inserted into the hot zone preheated to about 1,770° C. and continuously flushed with helium. After an initial drop in hot zone temperature to somewhat below 1,760° C., that temperature recovered to 1,760° C. during a period of 10 minutes from the time of inserting the green cylinder therein. At least the surface portion of this cylinder had attained about 1,760° C. at that time, at which point the helium was turned off and argon was then continuously flushed through the hot zone. Following this atmosphere change-over, the hot zone temperature was gradually increased to 1,800° C. over a period of 25 minutes. Thereafter, this cylinder was cooled and found to exhibit a large number of occluded bubbles within its central portion. This result demonstrates the fact that merely heating a silica body up to fusion temperature thereof in helium (thereby closing off the pores therein filled with helium) and thereafter surrounding it with argon for a substantial period of time does not yield the desired result of virtual freedom from occluded bubbles in the resultant vitreous silica body. Of course, without the change-over to argon from helium, at fusion temperatures, the results are even worse, viz. the body is very opaque due to massive numbers of occluded bubbles.

Mesh sizes stated herein are according to the Tyler sieve scale.

We claim:

1. The method of making a transparent, vitreous silica body that is at least virtually free of occluded bubbles,
    1. which includes the basic steps of
        a. forming a green body of substantially −60 mesh particles of material selected from crystalline silica and glass having a $SiO_2$ content of at least about 90 wt. percent, and
        b. firing said green body up to and at temperature in the range of about 1,730° to 2,200° C. to effect fusion and coalescence of said particles, and
    2. wherein the improvement comprises
        a. conducting a first phase of said firing of said green body in an ambient atmosphere of helium up to first temperature in the range of about 1,600° to 1,725° C. at a rate sufficient to effect sintering of said body to a state in which said body has helium-filled pores that, as predetermined by pressurized mercury pentration porosimetry,
            i. have open communication at the surface of said body with said atmosphere,
            ii. occupy about 5 to 20 percent of the volume of said body and
            iii. have pore diameters in the range of about 0.05 to 0.5 micron,
        b. then substantially changing said atmosphere to one of argon, and
        c. continuing said firing as a second phase thereof in said atmosphere of argon from said first temperature up to second temperature in a range of about 1,730° to 2,200° C. at a rate sufficient to concurrently effect i. the escape of the helium from said pores substantially through said communication with said atmosphere and
  ii. the virtual collapse and elimination of said pores.

2. The method of claim 1 wherein said second temperature is in the range of about 1,800° to 1,900° C.

3. The method of claim 1 wherein said particles are substantially −325 mesh.

4. The method of claim 1 wherein said green body is formed by slip casting said particles.

5. The method of making a thin, transparent, vitreous silica body that is at least virtually free of occluded bubbles,
  1. which includes the basic steps of
    a. forming a green body of thickness not greater than about ¼ inch and of substantially −60 mesh of material selected from crystalline silica and glass having a $SiO_2$ content of at least about 90 wt. percent, and
    b. firing said green body up to and at temperature in the range of about 1,730° to 2,200° C. to effect fusion and coalescence of said particles, and
  2. wherein the improvement comprises
    a. inserting said green body into a hot zone having a helium atmosphere at a firing temperature in the range of about 1,730° to 2,200° C.,
    b. while maintaining said body in said hot zone and upon said body attaining intermediate temperature in the range of about 1,600° to 1,725° C., substantially changing said atmosphere to one of argon, and
    c. thereafter continuing to maintain said body in said hot zone having said argon atmosphere until said body has attained said firing temperature.

6. The method of claim 5 wherein said firing temperature is in the range of about 1,800° to 1,900° C.

7. The method of claim 5 wherein said particles are substantially −325 mesh.

8. The method of making a transparent, vitreous silica body that is at least virtually free of occluded bubbles,
  1. which includes the basic steps of
    a. forming a green body of thickness greater than about ¼ inch and of substantially −60 mesh particles of material selected from crystalline silica and glass having a $SiO_2$ content of at least about 90 weight percent, and
    b. firing said green body up to and at temperature in the range of about 1,730° to 2,200° C. to effect fusion and coalescence of said particles, and
  2. wherein the improvement comprises
    a. as a first phase of said firing, inserting said green body into a hot zone having a helium atmosphere at first temperature in the range of about 1,600° to 1,725° C.,
    b. maintaining said body in said hot zone until said body has substantially uniformly attained said first temperature,
    c. then substantially changing said atmosphere to one of argon, and
    d. as a second phase of said firing, increasing the temperature of said hot zone, while maintaining said body therein, to second temperature in a range of about 1,730° to 2,200° C. at a rate sufficient to concurrently effect
      i. the escape of the helium from pores in said body substantially through open communication of said pores with said atmosphere at the surface of said body and
      ii. the virtual collapse and elimination of said pores.

9. The method of claim 8 wherein said second temperature is in the range of about 1,800° to 1,900° C.

10. The method of claim 8 wherein said particles are substantially −325 mesh.

* * * * *